United States Patent
Wang et al.

(10) Patent No.: US 8,837,356 B2
(45) Date of Patent: Sep. 16, 2014

(54) METHOD FOR IDENTIFYING CONNECTION, MOBILE STATION AND BASE STATION

(75) Inventors: Dongyao Wang, Shanghai (CN); Gang Shen, Shanghai (CN); Shan Jin, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 605 days.

(21) Appl. No.: 12/811,574

(22) PCT Filed: Jan. 4, 2008

(86) PCT No.: PCT/CN2008/000037
§ 371 (c)(1),
(2), (4) Date: Nov. 2, 2010

(87) PCT Pub. No.: WO2009/086691
PCT Pub. Date: Jul. 16, 2009

(65) Prior Publication Data
US 2011/0038312 A1    Feb. 17, 2011

(51) Int. Cl.
*H04W 4/00* (2009.01)
*H04W 76/02* (2009.01)
*H04W 8/26* (2009.01)

(52) U.S. Cl.
CPC ............ *H04W 76/021* (2013.01); *H04W 8/265* (2013.01)
USPC ........................................ 370/328

(58) Field of Classification Search
None
See application file for complete search history.

(56) References Cited

U.S. PATENT DOCUMENTS

| | | | |
|---|---|---|---|
| 2004/0185853 A1* | 9/2004 | Kim et al. | 455/438 |
| 2007/0082621 A1* | 4/2007 | Lee et al. | 455/69 |
| 2007/0091822 A1 | 4/2007 | Do et al. | |
| 2007/0110103 A1* | 5/2007 | Zimmerman et al. | 370/474 |
| 2007/0287449 A1* | 12/2007 | Ju et al. | 455/433 |
| 2008/0082990 A1* | 4/2008 | Kong et al. | 719/318 |
| 2008/0130549 A1* | 6/2008 | Chindapol et al. | 370/315 |
| 2008/0170516 A1* | 7/2008 | Carmon et al. | 370/310 |
| 2008/0268844 A1* | 10/2008 | Ma et al. | 455/436 |
| 2009/0092076 A1* | 4/2009 | Zheng et al. | 370/328 |
| 2009/0109932 A1* | 4/2009 | Maheshwari et al. | 370/335 |
| 2010/0178920 A1* | 7/2010 | Kitazoe et al. | 455/436 |

FOREIGN PATENT DOCUMENTS

| | | |
|---|---|---|
| CN | 1930804 A | 3/2007 |
| CN | 1988411 A | 6/2007 |

OTHER PUBLICATIONS

International Search Report for PCT/CN2008/000037.
Orfanos, G., "Development and Performance Evaluation of an MAC protocol fo MC-CDMA Wireless LANs with QoS Support," vol., 52, pp. 171-178, XP002610372, Jun. 19, 2006.
Park A. et al., "Address Compression Through Base Register Caching," IEEE Comput. Soc., pp. 193-199, XP010022277, Nov. 27, 1990.
European Search Report for 08700597.1 dated Nov. 19, 2010.

* cited by examiner

*Primary Examiner* — John Blanton
(74) *Attorney, Agent, or Firm* — Fay Sharpe LLP

(57) ABSTRACT

Disclosed are a method for identifying a connection, mobile station and base station. The method comprises the steps of: assigning a MS ID to the mobile station when the mobile station enters into the coverage area of the base station; and assigning a connection ID to a connection when the connection is established between the base station and the mobile station. With the proposed solution, the data overhead could be reduced due to short Connection ID instead of 16-bit CID in 802.16e, especially for VoIP traffic. In addition, due to adjustable bit-length of Connection ID, the tuple <MS ID, Connection ID> could flexibly support different numbers of connections while keeping overhead in minimal.

12 Claims, 5 Drawing Sheets

| Connection | Connection ID (8-bit) |
|---|---|
| Basic | 0x01 |
| Primary Management | 0x02 |

| MS ID (10-bit) | Value (0x000~0x3FF) | Allowable Connection ID(6-bit) (0x00~0x3F) |
|---|---|---|
| Initial Ranging Region | 0x000 | 0x00 |
| User Private Region | 0x001~0x2FF | 0x01~0x39 |
| Multicast Region | 0x300~0x3F9 | 0x01~0x39 |
| AAS Initial Ranging Region | 0x3FA | 0x3A |
| Normal Mode Multicast Region | 0x3FB | 0x3B |
| Sleep Mode Multicast Region | 0x3FC | 0x3C |
| Idle Mode Multicast Region | 0x3FD | 0x3D |
| Broadcast Region | 0x3FF | 0x3E ~ 0x3F |

METHOD FOR IDENTIFYING CONNECTION, MOBILE STATION AND BASE STATION

BACKGROUND OF THE INVENTION

1. Filed of Invention

The present invention relates to wireless communication, more particularly, to a method for identifying a connection in the connection-oriented MAC, a mobile station and a base station.

2. Description of Prior Art

With the rising requirements on broadband wireless communication, IMT-advanced being conducted by the International Telecommunications Union-Radio Communications Sector (ITU-R) has attracted more and more interests from researchers and companies all over the world. The standard IEEE 802.16m is intended to be a candidate for consideration in the IMT-Advanced evaluation process. Thus, IEEE802.16m shall meet the IMT-Advanced performance requirements, such as higher peak rates, lower system overhead as well as QoS and radio resource management (RRM).

As IEEE 802.16m is at the initial stage of standardization, all the technical solutions have not been defined, As proved in IEEE 802.16d/e, connection-oriented MAC is a good choice to support QoS classes, enabling an optimal matching of service, application and protocol requirements to radio access network (RAN) resources and radio characteristics. However, overhead for all applications shall be reduced as far as feasible without compromising overall performance and ensuring proper support of systems features.

In the standard of IEEE 802.16 D/E, a 16-bit value called CID is used to identify a connection in the medium access control layer (MAC) of the base station (BS) and subscriber station (SS). The CID address space is common (i.e., shared) between UL and DL and partitioned among the different types of connections. All the transported data blocks should be encapsulated as the form of MAC PDUs. As shown in FIG. 1, MAC header contains a 16-bit CID field to map those data to connections. In addition, the CID is also used by Base Station to allocate radio resources to MS or connection.

However, the scheme proposed in IEEE 802.16d/e has the shortcomings as follows. Overhead of MAC PDU introduced by CID is not minimal, and will waste too much radio resource due to high frequency use.

In addition, the BS should guarantee that the CID value is unique in one cell or sector, Which will make some control mechanisms more complex in some cases. For example, when one MS perform the handover operation from source BS to target BS, if there are active connections in the MS, the target BS should reassign new CID values for all these connections. This will again augment the overhead of control signaling.

SUMMARY OF THE INVENTION

It is an object of the invention to provide a method for identifying a connection in connection-oriented MAC, a mobile station and a base station, which can flexibly and efficiently identify a connection in connection-oriented MAC to reduce the system overhead.

In an aspect of the invention, there is provided a method for identifying a connection between a base station and a mobile station, comprising the steps of: assigning a MS ID to the mobile station when the mobile station enters into the coverage area of the base station; and assigning a connection ID to a connection when the connection is established between the base station and the mobile station.

In another aspect of the invention, there is provided a base station for identifying a connection between the base station and a mobile station, comprising: first assignment means for assigning a MS ID to the mobile station when the mobile station enters into the coverage area of the base station; and second assignment means for assigning a connection ID to a connection when the connection is established between the base station and the mobile station.

In still another aspect of the invention, there is provided a mobile station, which is identified by a MS ID assigned from a base station, comprising: receiving means for receiving, a message including a connection ID; and establishing a connection with the base station based on the connection ID.

With the proposed solution, the data overhead could be reduced due to short Connection ID instead of 16-bit CID in 802.16e, especially for VoIP traffic.

In addition, due to adjustable bit-length of Connection ID, the tuple <MS ID, Connection ID> could keep overhead introduced by CID in minimal. Subscriber station with few connections can use short-length Connection CID while those with a lot of connections can use long-length Connection CID.

The proposed solution can simplify the design of RRM (Radio Resource Management) mechanism. In the handover process, the old Connection IDs could be reserved and used in new serving BS. The handover control message is no more required to update CID, thus reducing the overhead of control signaling.

BRIEF DESCRIPTION OF THE DRAWINGS

Embodiments of the present invention will now be described, by way of example only, with reference to the accompanying drawings, in which.

DETAILED DESCRIPTION OF THE PREFERRED EMBODIMENTS

Hereafter, the specific embodiment of the present invention will be described with respect to the drawings.

In accordance with an embodiment of the present invention. M-bit MS ID is assigned to MS when mobile station enters the wireless network, and n-bit Connection ID is assigned to connection when the connection is established, wherein m and n are integer. MS ID is unique in the domain of cell or sector while Connection ID is unique in the domain of Mobile Station.

Figure 1:
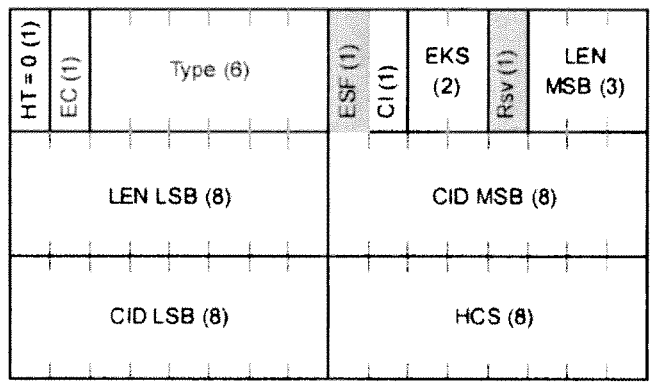
FIG. 1 shows a generic MAC header format according to IEEE802.16 D/E.
Figure 2:
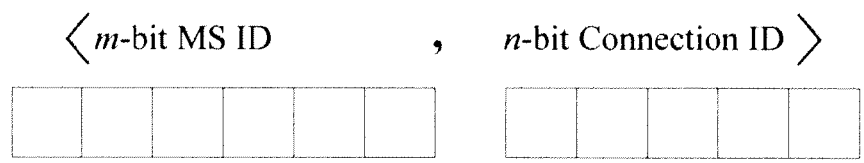
FIG. 2 shows a tuple of CID in accordance with an embodiment of the present invention.

FIG. 2 shows a tuple of CID in accordance with an embodiment of the present invention. As shown in FIG. 2, a tuple <MS ID, Connection ID> is used to identify one connection uniquely in one cell or sector, where the m-bit MS ID is defined to identify a Mobile station, and n-bit Connection ID is used to identify a connection. Therefore, the combination of MS ID and Connection ID could refer to one connection uniquely in the domain of cell or sector.

Figure 3:
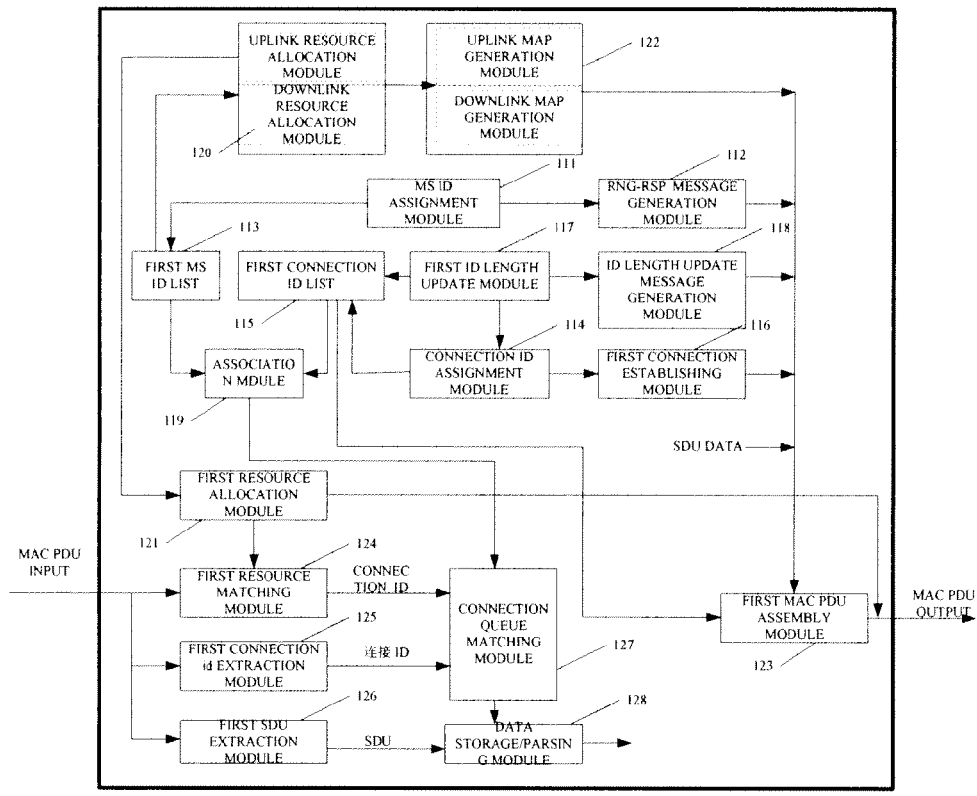
FIG. 3 shows an exemplary block diagram of the base station in accordance with an embodiment of the present invention.

FIG. 3 shows an exemplary block diagram of the base station in accordance with an embodiment of the present invention. As shown in FIG. 3, the base station according to an embodiment of the present invention comprises a MS ID assignment module 111, a RNG-RSP message generation module 112, a MS ID list 113, a connection ID assignment module 114, a first connection ID list 115, a first connection establishing module 116, an first ID length update module 117, an ID length update message generation module 118, an association module 119, a resource allocation module 120, a first resource allocation register module 121, a map generation module 122, a first MAC PDU assembly module 123, a first resource matching module 124, a first connection ID extraction module 125, a first SDU extraction module 126 and a connection queue matching module 127, and a data storage paring module 128.

Figure 5:
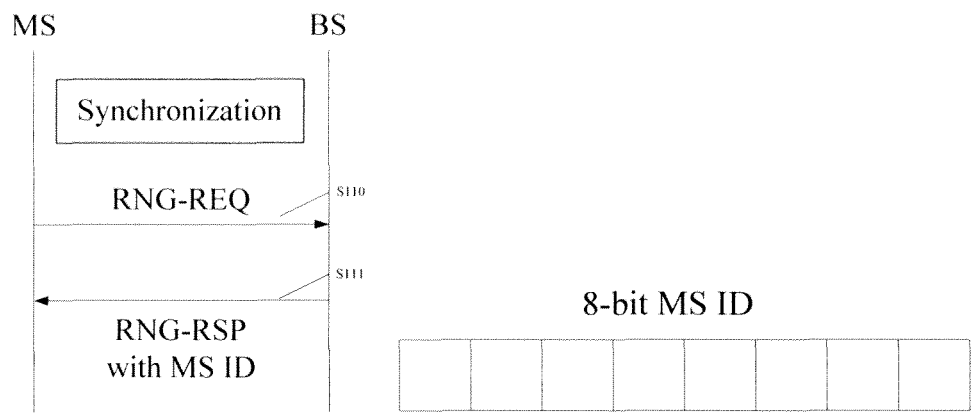
FIG. 5 shows a procedure of assigning MS ID to a mobile station in accordance with an embodiment of the present invention.

Suppose the Base Station can support maximum 255 active terminal devices such as mobile stations. Thus MS ID could be assigned to 8 bits. As shown in FIG. 5, after power on and synchronization, at Step 110, a MS will send ranging message (for example RNG-REQ) to the BS. The MS ID assignment module 111 generates an 8-bit MS ID that is not used currently and records this MS ID into the first MS ID list 113. Then, the RNG-RSP message generation module 112 generates a message such as RNG-RSP with the generated MS ID. At Step 111, the RNG-RSP message then is assembled by the first MAC PDU assembly module 123 with other information such as MAC header and check bits, and transmitted to the MS.

When establishing a connection with the MS, the connection ID assignment module 114 in the base station generates a connection ID which is unique in the domain of the MS on the basis of the length of connection ID. The first connection establishing module 116 generates a DSx signaling to interact with the MS. According to an embodiment of the invention, the signaling comprises the connection ID generated by the connection ID assignment module 114. Then the signaling is assembled into a MAC PDU by adding MAC header and check bits, and transmitted to the MS.

On the other hand, the connection ID generated by the connection ID assignment module 114 will be recorded into the first connection ID list 115.

Figure 6:
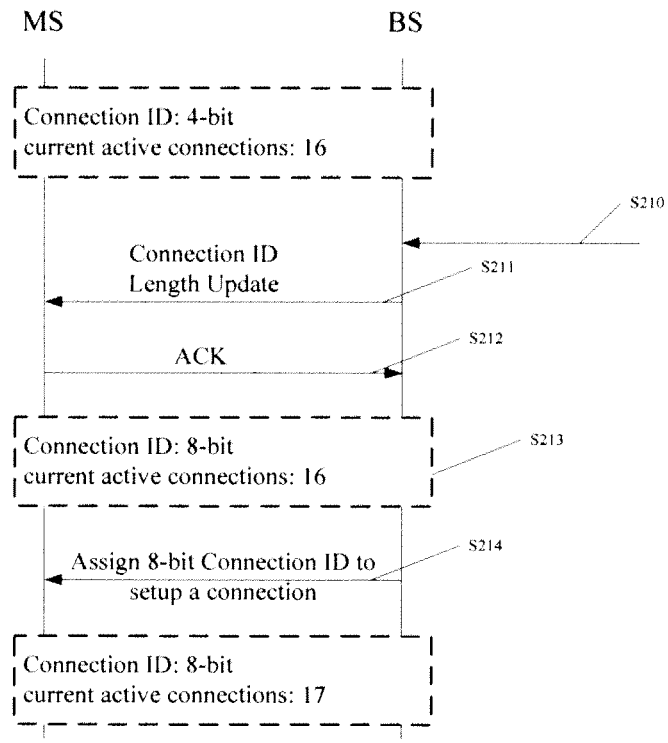
FIG. 6 shows a procedure of expanding Connection ID space in accordance with an embodiment of the present invention.

As shown in FIG. 6, the length of Connection ID for a Mobile Station could be initialized to 4 bits, indicating maximum 16 connections are supported including management connections. When a connection is established, the connection ID assignment module 114 of the BS will assign a 4-bit Connection ID for this connection.

According to an embodiment of the invention, the lengths of Connection ID can be changed on the fly. As described above, the 4-bit Connection ID is unique in the domain of MS and could only support 16 active connections. As shown in FIG. 6, if there are more than 16 active connections in a single MS. Base station can enlarge the length of Connection ID. For example, at Step 210, a new request to setup a connection comes, and the current Connection ID space is not enough. In this case, at Step 211, the first ID length update module 117 could expand the Connection ID space by sending a Connection ID length update message to MS, as shown in FIG. 6. That is, the ID length update message generation module 118 generates a connection ID update message including the new connection ID length, which will be assembled by the first MAC PDU assembly module 123, and transmitted to the MS. At Step 212, the MS will respond an ACK message to the BS.

If the connection ID needs to be changed from 4-bits to 8-bits, at Step 213, the first ID length update module 117 can add 4 bits into the old connection IDs in the first connection ID list 113 and set these bits as '0's. Therefore, the connection ID space is expanded from 16 to 256. Then, at Step 214, the BS will assign a 8-bit connection ID to establish a new connection with the MS. Finally, the number of current active connections is changed from 16 to 17.

In addition, the association module 119 is used to maintain the relationship between among MS IDs. Connection IDs and the actual connection queue. Generally, one MS ID corresponds to a plurality of Connection IDs, and a combination <MS ID, Connection ID> corresponds to one connection. Thus, a connection queue can be matched by using a MS ID and a connection ID.

By using MS ID list 113, the first connection ID list 15 and the association module 119, Base Station can maintain all m-bit MS IDs and n-bit Connection ID of its all subordinated MSs and connections, and their corresponding relationships.

As shown in FIG. 3, the resource allocation module 120 comprises an uplink resource allocation module for allocating resources for an uplink and a downlink resource allocation module for allocating resources for a downlink. The map generation module 122 comprises an uplink map generation module for generating an uplink map for the uplink on the basis of the resource allocation results and a downlink map generation module for generating a downlink map for the downlink on the basis of the resource allocation results. If one resource block is allocated to the MS, the resource block will be described by using respective MS ID. The resource allocation register module 121 registers that which resources are allocated to the MS.

The uplink map and downlink map will then be assembled in a MAC PDU by the MAC PDU assembly module 123, and then transmitted at the time-frequency resource determined by the resource allocation register module 121.

Figure 7:
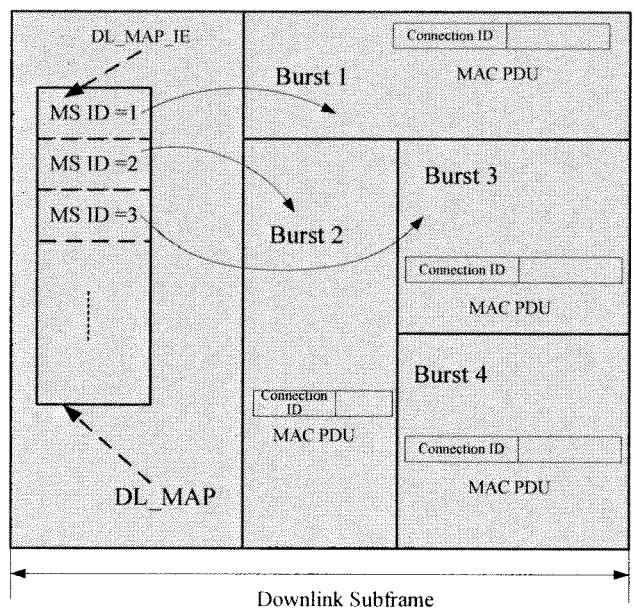
FIG. 7 is an illustrative diagram showing how to allocate downlink resource based on MS ID in accordance with an embodiment of the present invention.

For downlink, the resource allocation module 120 of the BS would firstly allocate bandwidth to MS based on MS ID as shown in FIG. 7. The map generation module 122 can generate corresponding DL MAP. For example. DL MAP is used to describe the allocated resource blocks and each DL_MAP_IE identified by MS ID points to one specific resource block, i.e. one burst.

Figures 8, 9:
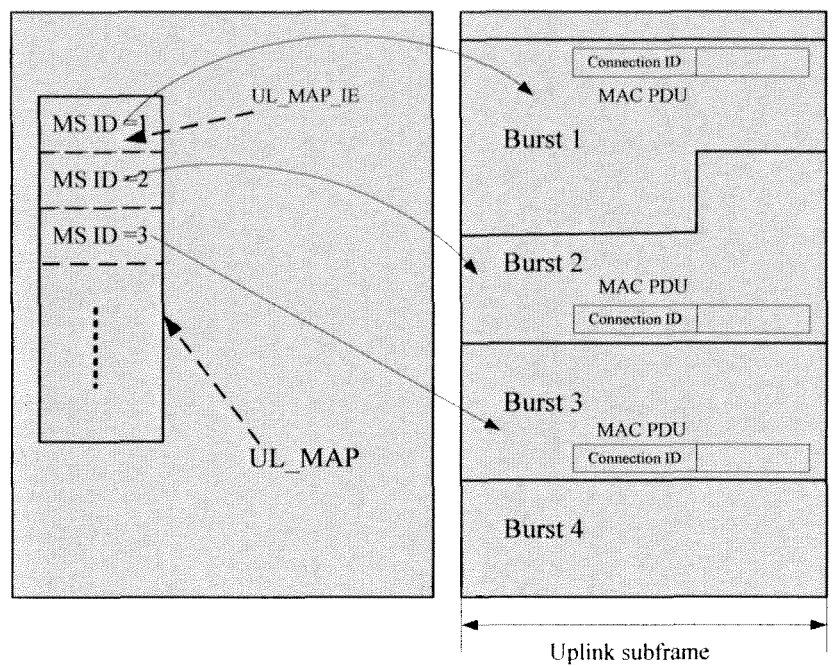
FIG. 8 is an illustrative diagram showing how to allocate uplink resource based on MS ID in accordance with an embodiment of the present invention.
FIG. 9 is an illustrative table showing pre-assigned Connection ID for Basic Connection and Primary Management Connection in accordance with an embodiment of the present invention.

For uplink, the resource allocation module 120 of the BS also firstly allocates bandwidth to MS based on MS ID as shown in FIG. 8. The map generation module 122 can generate corresponding UL MAP. For example, UL MAP is used to allocate resource blocks and each UL_MAP_IE identified by MS ID points to one specific resource block, i.e. one burst.

When received a MAC PDU, the BS can detect the transmission position (time-frequency block) of the MAC PDU, and the first resource matching module 124 can determine this resource block should belong to which MS ID such that the MS ID for the MS can be determined.

On the other hand, the first connection ID extraction module 125 can extract the connection ID from the header of the MAC PDU, and the first SDU extraction module 126 can extract the SDU from the MAC PDU to output the extracted PDU.

The connection queue matching module 127 can determine the inputted MAC PDU belongs to which connection on the basis of the associated by the association module 119. Then, the data storage/parsing module 128 saves the data of SDU into the matched connection queue. If the data is a signaling message, the data storage/parsing module 128 parses the signaling and responds it.

Figure 4:
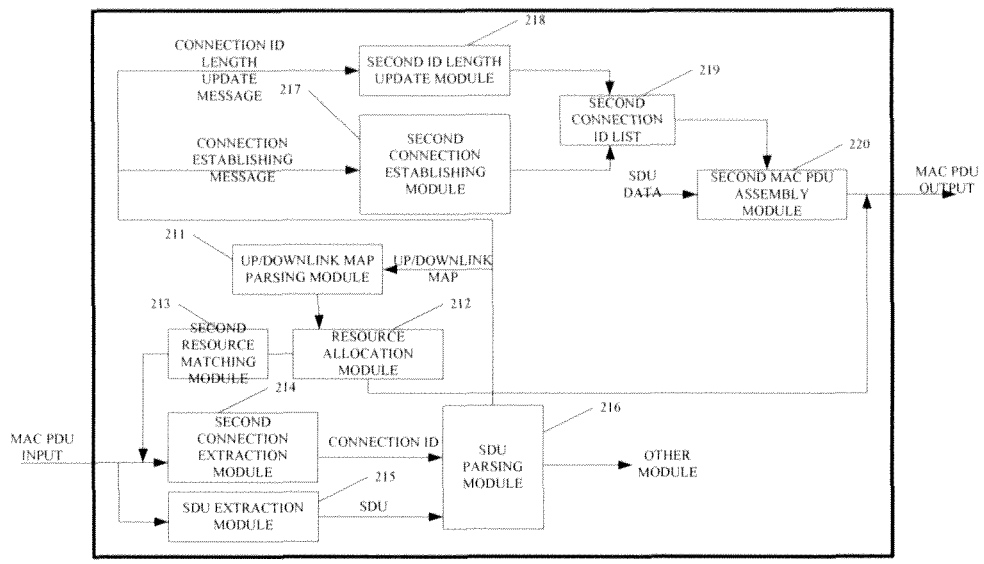
FIG. 4 shows an exemplary block diagram of the mobile station in accordance with an embodiment of the present invention.

FIG. 4 shows an exemplary block diagram of the mobile station in accordance with an embodiment of the present invention. As shown in FIG. 4, the mobile station (MS) according to an embodiment of the invention comprises a second connection ID extraction module 214, a second SDU extraction module 215, a SDU parsing module 216, a second resource matching module 213, a second resource allocation register module 212, a map parsing module 211, a second connection establishing nodule 217, an second ID length update module 218, a second connection ID list 219, and a second MAC PDU assembling module 220.

As described above, when a MAC PDU is inputted, the second connection ID extraction module 214 extracts the connection ID from the header of the MAC PDU, and the second SDU extraction module 215 extracts the SDU from the MAC PDU.

Then, the SDU parsing module 216 can determine the type of the SDU according to the connection ID. That is, the SDU may be of data or signaling. If the type of the SDU is DL/UL-MAP, the extracted SDU will be sent to the map parsing module 211, where the DL/UL-MAP is parsed to get the positional information about the uplink/downlink resource block and store it into the second resource allocation register module 212. Similarly, the second resource allocation register module 212 can determine when the data can be transmitted or received on the basis of the allocated time-frequency resources.

In addition, the second resource matching module 213 of the MS can only allow the MAC PDUs, which are matched with the resource block, to be inputted. In other words, the second resource matching module 213 can determine which MAC PDUs can be received by the MS.

On the other hand, if the type of the SDU is a connection establishing message, the SDU parsing module 216 will send this message to the connection establishing module 217. If the type of the SDU is a connection length update message, the SDU parsing module 216 will send it to the second ID length update module 218.

Therefore, after receiving and parsing the DL_MAP, each MS would know where its downlink allocated resource blocks are and will receive its carried data packets in future. With the attached Connection ID in MAC PDU, MS could match the data packets to connections.

In addition, after receiving and parsing the UL_MAP, each MS would know where its uplink allocated resource blocks are and will transmit MAC PDUs with Connection IDs attached in those allocated resource blocks. On the other hand, when BS receives these MAC PDUs, BS can know which MS has transmitted these MAC PDUs. Therefore, BS could match these data packets to connections according to the attached Connection ID in MAC PDUs.

The connection establishing module 217 can establish a connection according to the connection establishing message, and generate a response message to acknowledge that the MS has accepted the connection establishing request.

If the ID length update message shows the connection ID needs to be changed from 4-bits to 8-bits, the second ID length update module 218 can add 4 bits into the old connection IDs in the second connection ID list 219 and set these bits as '0's and store the updated connection IDs into the second connection ID list 219.

The second MAC PDU assembly module 219 can assemble the response message or other SDU data into a MAC PDU with additional information such as header and check bits.

FIG. 9 is an illustrative table showing pre-assigned Connection ID for Basic Connection and Primary Management Connection in accordance with an embodiment of the present invention. During the procedure of network entry, it is not necessary for BS to allocate and assign Basic CID, Primary Management CID to MS. Some specific Connection ID can be pre-assigned to Basic Connection and Primary Management Connection. After MS complete DL/UL synchronization and RNG-REQ/RSP procedure, both BS and MS will use the reserved 0x01 and 0x02 Connection ID to initialize bidirectional Basic Connection and Primary Management Connection.

Figures 10, 11:
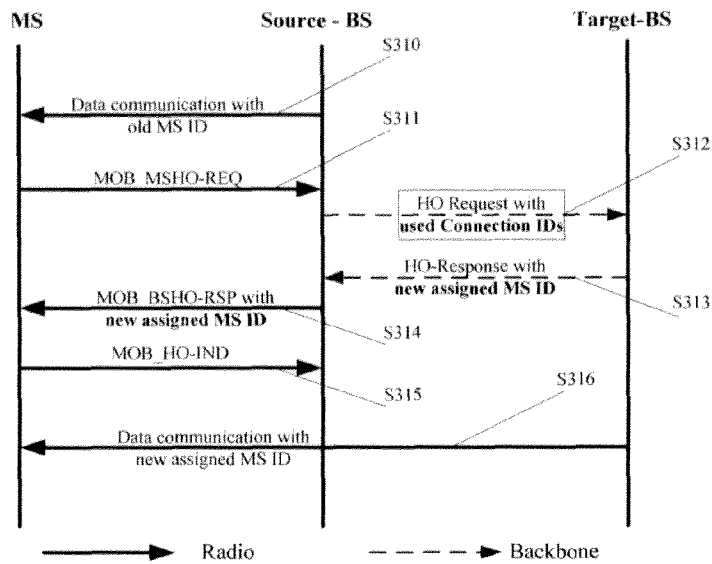
FIG. 10 shows a handover procedure in accordance with an embodiment of the present invention.
FIG. 11 shows an exemplary usage of MS IDs with an embodiment of the present invention.

FIG. 10 shows a handover procedure in accordance with an embodiment of the present invention. As shown in FIG. 9, if the MS is determined to perform handover operation from a source BS to the target BS, the following steps are performed.

At step 310, before handover MS receives or sends data packet form/to source BS based on old MS ID which is effective in the domain of Source BS.

At Step 311, after MS decide to initialize the handover operation, it will send MOB-MSHO_REQ message to Source BS via air interface to request to handover to other BS.

At Step 312, when receiving MOB-MSHO_REQ message, BS will select one BS as target BS from candidates, and negotiate with the target BS by sending HO-request message which includes the information of used Connection IDs for this MS.

At Step 313, the target BS will save the information of used Connection IDs for the handovering MS and assign a new MS ID. The new assigned MS ID will be sent to Source BS by HO-Response message.

At Step 314, after getting the new MS ID, source BS will respond to MS with MOB-MSHO_RSP message and notify MS the new MS ID.

At Step 315, MS will send MOB-MSHO-IND to source BS to start handover operation.

At Step 316, after completing handover, MS will communicate with target BS based on new assigned MS ID and old Connection IDs.

It should be noted that some MS IDs may be pre-determined for some special purposes in practice. FIG. 11 shows an exemplary usage of MS IDs with an embodiment of the present invention (take 10-bit MS ID and 6-bit Connection ID as an example). For example, MS ID with value 0 can be used to allocate one Initial Ranging Region in which MS can perform ranging operation. And MS ID with maximum value (0x3FF in 10-bit MS ID) can be used to allocate one Broadcast Region which will carry broadcast information that will be delivered to a plurality of MSs. For different MS ID classes, different sets of Connection IDs may be allowed.

In other words, the MS ID may be specific for the predeteimined objection or application. For example, the predetermined objection comprises different multicast groups, normal subscriber stations group, idle subscriber stations group and sleep subscriber stations group, and the predetermined application comprises one of the initial ranging and broadcast.

With the proposed scheme, the data overhead could be reduced due to short Connection ID instead of 16-bit CID in 802.16e, especially for VoIP traffic.

In addition, due to adjustable bit-length of Connection ID, the tuple <MS ID, Connection ID> could flexibly support different numbers of connections while keeping overhead in minimal.

Furthermore, the proposed solution could simplify the design of RRM (Radio Resource Management) mechanism. In network entry process, the reserved Connection IDs could be used for Basic Connection and Primary Management Connection. In the handover process, the old Connection IDs could be reserved and used in new serving BS. The handover control message is no more required to update CID, thus reducing the overhead of control signaling.

While the invention has been particularly shown and described with reference to exemplary embodiments thereof, the invention is not limited to these embodiments, it will be understood by those of ordinary skill in the art that various changes in form and details may be made therein without departing from the spirit and scope of the present invention as defined by the claims.

What is claimed is:

1. A method for identifying a transport connection between a base station and a mobile station (MS) uniquely in a domain of a cell or sector using a tuple <MS ID, Connection ID> in connection-oriented MAC, comprising:
    assigning a MS ID to the mobile station when the mobile station enters into the coverage area of the base station wherein the MS ID is unique in the domain of a cell or a sector; and
    assigning a connection ID to a connection when the connection is established between the base station and the mobile station, wherein the connection ID is unique in the domain of the mobile station and the combination of the MS ID and the connection ID is used to identify one connection uniquely in the domain of the mobile station.

2. The method of claim 1, wherein the MS ID is denoted with m bits and the connection ID is denoted with n bits, wherein m and n are integers.

3. The method of claim 2, further comprising: adding at least one bit to the connection ID.

4. The method of claim 2, wherein the connection IDs for the specific mobile station have the same length.

5. The method of claim 2, wherein a set of connection IDs is reserved for signaling connections.

6. The method of claim 2, further comprising: allocating radio resources for the mobile station based on the MS ID.

7. The method of claim 6, wherein allocating radio resources for each mobile station based on the MS ID further comprises:
    allocating at least one resource block for a downlink based on the MS ID; and
    allocating at least one resource block for a uplink based on the MS ID.

8. The method of claim 7, wherein when transmitting, the resource block is filled with MAC PDUs whose header contains a field containing n-bit Connection ID.

9. The method of claim 3, further comprising: updating the MS ID in the case of the mobile station moving from the coverage area of the base station to the coverage area of another base station.

10. The method of claim 9, wherein the connection ID for the mobile station is maintained when the mobile station moves from the coverage area of the base station to the coverage area of another base station.

11. A base station for identifying a connection between the base station and a mobile station (MS) uniquely in a domain of a cell or sector using a tuple <MS ID, Connection ID> in connection-oriented MAC, comprising:
    an MS ID assignment module configured to assign an MS ID to the mobile station when the mobile station enters into the coverage area of the base station, wherein the MS ID is unique in the domain of a cell or a sector; and
    a connection ID assignment module configured to assign a connection ID to a connection when the connection is established between the base station and the mobile station, wherein the connection ID is unique in the domain of the mobile station and the combination of the MS ID and the connection ID is used to identify one connection uniquely in the domain of the mobile station.

12. A mobile station (MS), which is identified by an MS ID of a tuple <MS ID, Connection ID> assigned from a base station in connection-oriented MAC when the mobile station enters into a coverage area of the base station, the mobile station comprising:
    a receiver configured to receive a message including a connection ID; and
    a connector configured to establish a connection with the base station based on the connection ID, wherein the MS ID is unique in the domain of a cell or a sector and the connection ID is unique in the domain of the mobile station and the combination of the MS ID and the connection ID is used to identify one connection uniquely in the domain of the mobile station.

* * * * *